United States Patent [19]

Hoodbhoy

[11] Patent Number: 4,481,569

[45] Date of Patent: Nov. 6, 1984

[54] FEEDBACK SYSTEM FOR ROBOT CONTROLLER

[75] Inventor: Samir A. Hoodbhoy, Brooklyn Park, Minn.

[73] Assignee: Kurt Manufacturing Company, Inc., Minneapolis, Minn.

[21] Appl. No.: 391,515

[22] Filed: Jun. 24, 1982

[51] Int. Cl.³ .............................................. G05B 19/18
[52] U.S. Cl. .................................... 364/183; 364/513; 364/167; 318/601; 318/574
[58] Field of Search ............... 364/183, 513, 167, 168, 364/169; 318/601, 574, 603

[56] References Cited

U.S. PATENT DOCUMENTS

| | | | |
|---|---|---|---|
| 3,742,326 | 6/1973 | Okuda et al. | 318/601 |
| 4,260,940 | 4/1981 | Engelberger et al. | 318/574 |
| 4,264,850 | 4/1981 | Cannon et al. | 318/601 |
| 4,277,191 | 7/1981 | Davis et al. | 364/183 |
| 4,342,077 | 7/1982 | Passey et al. | 364/183 |

Primary Examiner—Joseph F. Ruggiero
Assistant Examiner—John R. Lastova
Attorney, Agent, or Firm—Kinney & Lange

[57] ABSTRACT

A feedback system for a robot controller provides feedback signals representing incremental motion along an axis in either a first or second direction based upon a pair of encoder signals from a position encoder. The feedback system includes circuitry which produces a pair of signals indicating the state of the first encoder signal and whether the first encoder signal has changed state, and circuitry which produces a pair of signals indicating the state of the second encoder signal and whether the second encoder signal has changed state. A read only memory receives these four signals at its address inputs and produces the first and second feedback signals at its data outputs based upon stored microcode. The encoder signals may be in the form of pulsed up-/down feedback, where one of the two encoder signals contains pulses and the other encoder signal remains unchanged. Alternatively, the encoder signals may be in the form of sinusoidal or squarewave quadrature feedback in which a quarter cycle lead/lag relationship exists between the first and second encoder signals to indicate the direction of movement.

31 Claims, 18 Drawing Figures

A1

A2

$A_{UP}$ $A_{DN}$

A1

A2

$A_{UP}$ $A_{DN}$

A1

A2

A$_{UP}$

A$_{DN}$

A1

A2

A$_{UP}$

A$_{DN}$

FEEDBACK SYSTEM FOR ROBOT CONTROLLER

BACKGROUND OF THE INVENTION

1. Field of the Invention

The present invention relates to closed loop control systems for controlling a robot or other movable apparatus. In particular, the present invention relates to a feedback system for producing feedback signals representing incremental motion along an axis of movement based upon encoder signals.

2. Description of the Prior Art

With increasing labor costs and with the advent of increasingly sophisticated servo controls, digital electronics and computer technology, industrial robots are finding ever-increasing use. An important part of any robot is the electronic control system, which controls movement of the various members of the robot in one or more axes of movement. The control system typically includes electric or hydraulic servo motors for providing movement along various axes, encoders for sensing incremental movement along each of the axes, feedback circuitry for processing the encoder signals, and control circuitry for providing commands to the servo motors based upon both a stored program of movements and the feedback signals from the feedback circuitry.

The encoders and feedback circuitry typically perform two important functions in the operation of the control system. First, the encoder and feedback cirtuitry are used during a "teaching" mode in which the robot is moved through the desired sequence of motions in the various axes. The encoder signals are processed by the feedback circuitry, which provides feedback signals to the control circuitry to store data representing the motion required in each of the various axes of movement.

In the "playback" mode, the robot is actually repeating what it has previously been taught to do. In this mode, the control circuitry uses the stored data obtained during the teaching mode to generate command signals. Based upon the command signals and the feedback signals generated during the playback mode, the control circuitry controls the servos to cause the robot to duplicate the movements taught during the teaching mode.

In typical robot controllers, the encoder signals take one of several commonly used forms. In sinusoidal feedback, each encoder produces a sine wave and a cosine wave encoder signal representing motion along one axis. The phase relationship between the sine and cosine encoder signals indicates the direction of movement along the axis.

A second similar type of encoder feedback is quadrature feedback, in which the encoder signals are in the form of a pair of squarewave signals which are ninety degrees phase shifted with respect to one another. The phase relationship between the two squarewave encoder signals indicates the direction of movement along the axis.

A third type of encoder feedback is known as pulsed up/down feedback. In this type of feedback, there are two encoder signals ("UP" and "DOWN"), but at any time only one of the two encoder signals contains a pulse indicating each increment of movement along the axis. The UP encoder signal represents one direction of movement along the axis, and the DOWN encoder signal represents the opposite direction of movement along the axis.

In the past, the feedback circuitry needed to process the encoder signals has required a large number of electronic components. It has not been unusual for the feedback circuitry to require a single circuit board for each axis. In the case of robot controllers which are controlling as many as six different axes of movement, the complexity of the feedback circuitry significantly affects the cost, reliability, and size of the robot controller. There is a continuing need for improved feedback circuitry which utilizes significantly fewer components, which is lower in cost, more reliable and more compact than the circuitry used in the prior art, and which can be used with a wide variety of encoder signal formats.

SUMMARY OF THE INVENTION

The present invention is a feedback system for providing first and second feedback signals which represent incremental motion of a movable means in first and second directions, respectively, along an axis. These first and second feedback signals are based upon first and second encoder signals received from an encoder means which senses incremental motion of the movable means along the axis.

The feedback system of the present invention includes first means for receiving the first encoder signal and for providing signals which indicate the current state of the first encoder signal and the state of the first encoder signal at a previous time. The feedback system also includes second means for receiving the second encoder signal and for providing signals which indicate the current state of the second encoder signal and the state of the second encoder signal at a previous time. The feedback system also includes memory means which contains stored code and which has address inputs for receiving the signals from the first and second means and outputs for providing first and second feedback signals. The memory means produces the first and second feedback signals as a function of the stored code and the signals received from the first and second means.

In a preferred embodiment of the present invention, the first means includes first and second flipflop means and the second means includes third and fourth flipflop means, all of which receive a clock signal from clock means. The first flipflop means has an input for receiving the first encoder signal, a clock input for receiving the clock signal, and an output for providing a first signal having a state which is a function of the state of the first encoder signal when the clock signal is received. The second flipflop means has an input for receiving the first signal, a clock input for receiving the clock signal, and an output for providing a second signal having a state which is a function of the state of the first signal when the clock signal is received. The first signal has a state, therefore, which represents the current state of the first encoder signal, while the second signal has a state which represents the state of the first encoder signal at a previous time (i.e. one clock signal pulse earlier in time).

Similarly, the third flipflop means has an input for receiving the second encoder signal, a clock input for receiving the clock signal, and an output for providing a third signal having a state which is a function of the state of the second encoder signal when the clock signal is received. The fourth flipflop means has an input for receiving the third signal, a clock input for receiving the clock signal, and an output for providing a fourth signal having a state which is a function of the state of the third signal when the clock signal is received. The third signal, therefore, represents the current state of the second encoder signal, while the fourth signal represents the state of the second encoder signal at a previous time.

In this preferred embodiment, the memory means receives the first, second, third and fourth signals at its address inputs and provides the first and second feedback signals as a function of the stored code and the first, second, third and fourth signals.

Depending upon the particular stored code in the memory means, the encoder signals can be in various signal formats, such as sinusoidal, squarewave quadrature or pulsed up/down format. In the case of sinusoidal encoder signal format, the feedback system preferably includes input circuitry to convert the first and second encoder signals from sinusoidal to squarewave quadrature format.

DETAILED DESCRIPTION OF THE PREFERRED EMBODIMENTS

Figure 1:
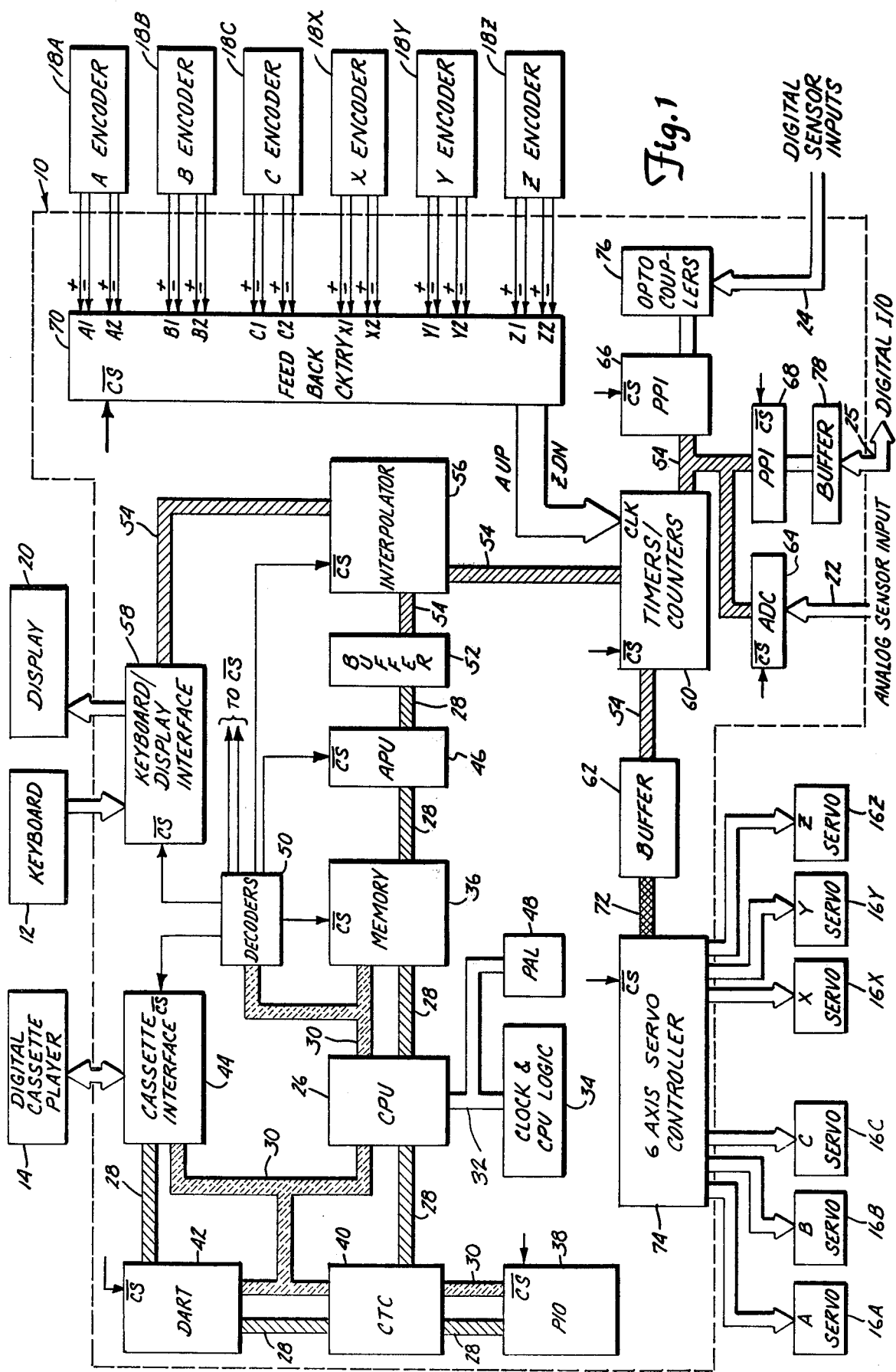
FIG. 1 is an electrical block diagram of a control system of a robot controller which utilizes the feedback system of the present invention.

FIG. 1 shows control system 10 of a robot controller which utilizes the feedback system of the present invention. Control system 10 receives input signals from keyboard 12 and digital cassette player 14 and controls movement in a total of six different axes (labeled A, B, C, X, Y and Z) by providing output signals to servos 16A, 16B, 16C, 16X, 16Y, and 16Z. In preferred embodiments of the present invention, servos 16A–16Z are electric or hydraulic servo motors and the output signals are analog electrical signals.

Control system 10 provides closed loop control by receiving a pair of encoder signals for each axis from encoders 18A, 18B, 18C, 18X, 18Y, and 18Z. Each pair of encoder signals (for example, A1 and A2 from encoder 18A) are representative of incremental motion in either a first or second direction along a particular axis. For example, signals A1 and A2 together provide an indication of incremental motion along the A axis. The pairs of encoder signals are in one of several well-known formats, such as sinusoidal, squarewave quadrature, or pulsed up/down format.

Control system 10 provides a visual output through display 20, which is used in conjunction with keyboard 12 to assist the user in entering control information. Error messages and other useful information is also displayed by display 20 under the control of control system 10.

In the preferred embodiment shown in FIG. 1, control system 10 also includes analog inputs 22 which receive analog input signals from various analog sensors and digital inputs 24 for receiving inputs from digital sensors. Digital input/output (I/O) port 25 permits control system 10 to communicate with other digital circuitry, such as a digital computer.

The functions of control system 10 are controlled and coordinated by central processing unit (CPU) 26, which in a preferred embodiment is a microprocessor. CPU 26 communicates with other digital circuitry of control system 10 through first data bus 28, address bus 30, and control lines 32.

Associated with CPU 26 are clock and CPU logic 34, memory 36, parallel input/output port (PIO) 38, counter timer chip (CTC) 40, dual universal asyncronous receiver transmitter (DART) 42, cassette interface 44, arithmetic processor unit (APU) 46, programmable array logic (PAL) chip 48, address decoders 50, and buffer 52.

Memory 36 preferably includes both random access memory (RAM) storage for storing data and read only memory (ROM) storage for storing operating programs for control system 10.

CPU 26 interfaces and controls operation of digital cassette player 14 by means of PIO 38, CTC 40, DART 42, and cassette interface 44. Digital cassette player 14 plays digital magnetic cassettes which store movements in each of the axes during the teaching mode and which supply signals representing the stored motion during the playback mode.

APU 46 is an arithmetic processor unit which assists CPU 26 in performing certain mathematical functions. These include addition, subtraction, multiplication, division, and trigonometric functions. PAL 48 is a programmable array logic chip which is used for bookkeeping signal conditioning functions. It interfaces with CPU 26 through control lines 32.

CPU 26 selects the particular circuitry in use by means of address decoders 50. The input to decoder 50 is address bus 30, and the outputs are individual lines supplied to the chip select ($\overline{CS}$) inputs of various circuits within control system 10.

Buffer 52 is connected to first data bus 28, and provides an interface between CPU 26 and other circuitry of control system 10 which is connected to second data bus 54. This circuitry includes interpolator 56, keyboard/display interface 58, timers/counters 60, buffer 62, analog-to-digital converter (ADC) 64, programmable peripheral interface (PPI) 66, and programmable peripheral interface (PPI) 68.

Interpolator 56 provides control system 10 with circular, linear, and parabolic contouring capability. By performing these specialized tasks, interpolator 56 frees CPU 26 for other activities.

CPU 26 receives inputs from keyboard 12 and provides outputs to display 20 through keyboard/display interface 58. The inputs from keyboard 12 include operation command signals, data entry signals, function select signals, and various manual control input signals. These signals are supplied through second data bus 54, buffer 52, and first data bus 28 to CPU 26.

Timers/counters 60 are used during both the teaching mode and the playback mode. During the teaching mode, feedback pulses are supplied by feedback circuitry 70 to the clock (CLK) inputs of timers/counters 60. In the embodiment shown in FIG. 1, there are a total of six axes for which feedback is supplied. For each axis, feedback circuitry 70 provides an UP and a DN feedback signal. There are, total of twelve feedback signals ($A_{UP}$, $A_{DN}$; $B_{UP}$, $B_{DN}$; $C_{UP}$, $C_{DN}$; $X_{UP}$, $X_{DN}$; $Y_{UP}$, $Y_{DN}$; and $Z_{UP}$, $Z_{DN}$), supplied from feedback circuitry 70 to the clock inputs of timers/counters 60. The $A_{UP}$ feedback signal represents an increment of motion in a "positive" direction along the A axis, while the $A_{DN}$ pulse represents an increment of motion in the "negative" direction along the A axis, and so on. Timers/counters 60 count up or down in response to the respective feedback signals supplied to their clock inputs.

In the teaching mode, the timers/counters 60 are sampled by CPU 26 every ten milliseconds, and a decision is made as to the movement which occurred during that sample period. In other words, there is a determination of how many new feedback pulses were received during the sample period. This information is processed by CPU 26 and the associated digital circuitry shown in FIG. 1. In the preferred embodiment, CPU 26 performs a filtering algorithm which decides whether the data from timers/counters 60 is to be filtered or not, and how it is to be stored.

In the playback mode, timers/counters 60 accept command data from CPU 26 through second data bus 54, and receive feedback pulses from feedback circuitry 70. Based upon these signals, timers/counters 60 provide control signals in the form of digital data through buffer 62 and third data bus 72 to six axis servo controller 74. The outputs of servo controller 74 are analog control signals which are supplied to servos 16A, 16B, 16C, 16X, 16Y and 16Z. Six axis servo controller 74 preferably includes, for each axis, a digital-to-analog converter, a linear amplifier, and a power amplifier to provide the analog output control signal to the particular servo 16A–16Z.

Control system 10 of FIG. 1 includes an analog sensor input which accepts up to eight differential conditioned analog inputs (e.g. temperature, pressure, viscosity, and other sensed parameters) at analog input port 22. These inputs are supplied to ADC 64, where they are converted to digital values and supplied on second data bus 54 through buffer 52 and first data bus 28 to CPU 26. These analog sensor inputs can be used by CPU 26 to select particular operations, or to modify the particular movement along the various axes as a function of the sensed parameters.

Control system 10 has a digital sensor input port 24 which accepts digital inputs from as many as sixteen sensors (e.g. proximity switches, infrared sensors, etc.). The digital inputs supplied at digital input port 24 are optically isolated by optocouplers 76, and signals are supplied through PPI 66 onto second data bus 54. The signals are then supplied through buffer 52 and data bus 28 to CPU 26. Like the analog sensor inputs, the digital sensor inputs can be used by CPU 26 to control movement along the various axes as a function of the sensor inputs.

Control system 10 also includes serial digital I/O port 25, which interfaces through buffer 78 and PPI 68 with second data bus 54. I/O port 25 permits control system 10 to be linked with a CRT monitor, a modem, or a host computer.

In a preferred embodiment of the present invention, control system 10 is contained on a single printed circuit board. This significant reduction in the size of control system 10 in comparison to prior art robot controllers is due in large part to feedback circuitry 70 of the present invention. In the prior art, the feedback circuitry required to convert encoder signals into feedback pulses was quite complex, and it often required a single printed circuit board for each axis. In contrast, the feedback circuitry 70 of the present invention requires far fewer components, and forms only a small part of the components which form control system 10.

Figure 2:
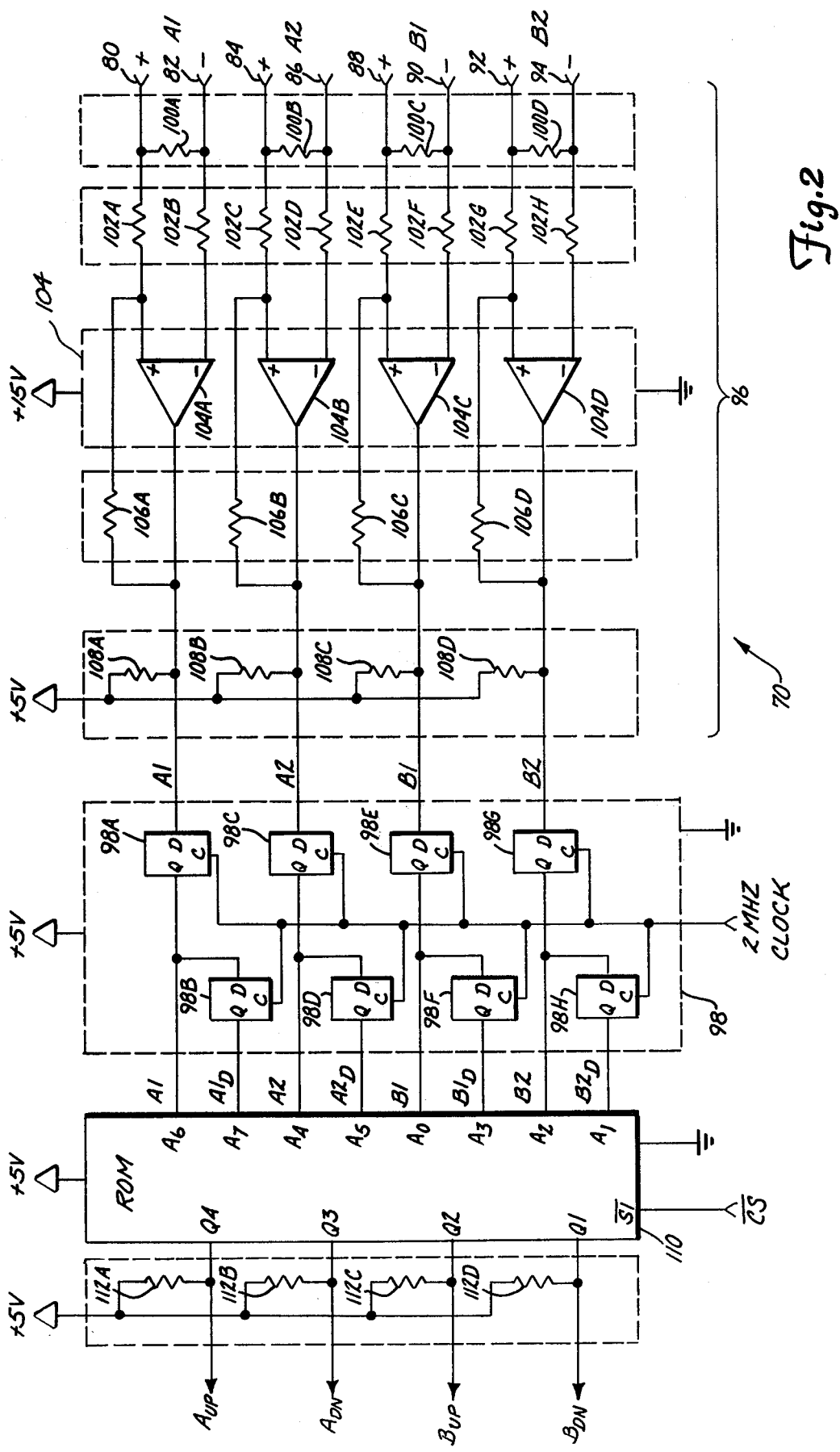
FIG. 2 is an electrical schematic diagram showing the feedback system of the present invention for two axes of motion.
Figure 3A:
FIGS. 3A–3D show, in squarewave quadrature format, first and second encoder signals A1 and A2 and first and second feedback signals $A_{UP}$ and $A_{DN}$, respectively, representing motion in a positive direction along axis A of the system of FIGS. 1 and 2.
Figure 3B:
Figure 3C:
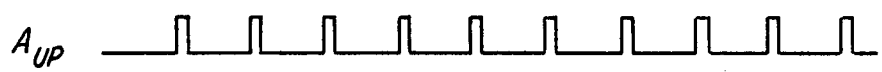
Figure 3D:
Figure 4A:
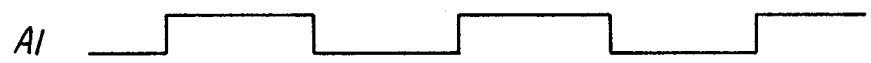
FIGS. 4A–4D show, in squarewave quadrature format, first and second encoder signals A1 and A2 and first and second feedback signals $A_{UP}$ and $A_{DN}$, respectively, representing motion in a negative direction along axis A of the system of FIGS. 1 and 2.
Figure 4B:
Figure 4C:
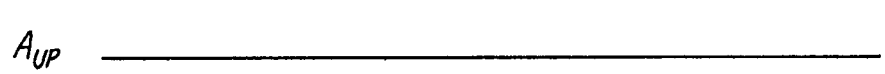
Figure 4D:

FIG. 2 is an electrical schematic diagram which shows a portion of the feedback circuitry which receives encoder signals A1, A2, B1 and B2 and which produces up and down feedback pulses ($A_{UP}$, $B_{UP}$ and $A_{DN}$, $B_{DN}$) for the A and B axes. The circuitry shown in FIG. 2, therefore, constitutes one-third of the components used in feedback circuitry 70. The portions of the feedback circuitry used to process the C1, C2, X1 and X2 encoder signals and the portion of the circuitry used to process the Y1, Y2, Z1 and Z2 encoder signals is preferably identical to that shown in FIG. 2. For the sake of simplicity, only the portion of the feedback circuitry relating to the A and B axes will, therefore, be discussed.

In the embodiment shown in FIG. 2, the A1 encoder signal is received at input terminals 80 and 82; the A2 encoder signal is received at input terminals 84 and 86; the B1 encoder signal is received at input terminals 88 and 90; and the B2 encoder signal is received at input terminals 92 and 94.

The encoder signals are initially processed by input section 96 to produce squarewave signals at the inputs of flipflop chip 98, even if the encoder signals are initially in sinusoidal format. Input section 96 includes termination resistors 100A–100D, input resistors 102A–102H, comparator chip 104, feedback resistors 106A–106D, and pull-up resistors 108A–108D. The outputs of flipflop chip 98 are supplied to the address inputs of read only memory (ROM) chip 110. The data outouts of ROM 110 are the $A_{UP}$, $A_{DN}$, $B_{UP}$ and $B_{DN}$ feedback signals which are supplied to the clock inputs of timers/counter 60 of FIG. 1. Pull-up resistors 112A–112D are connected at the outputs of ROM 110 to ensure proper signal levels for the feedback signals.

Termination resistors 100A–100D are preferably 1 Kohm resistors in an eight-pin, single in-line package (SIP). Resistor 100A is connected betweein input terminals 80 and 82; resistor 100B is connected between input terminals 84 and 86; resistor 100C is connected between input terminals 88 and 90; and resistor 100D is connected between input terminals 92 and 94.

Input resistors 102A–102D are preferably 22-ohm resistors in a sixteen-pin dual in-line package (DIP). Resistors 102A and 102B are connected between input terminals 80 and 82 and the + and − inputs of amplifier 104A of comparator chip 104, respectively. Similarly, resistors 102C and 102D are connected between inputs 84 and 86 and the + and − inputs of amplifier 104B. Resistors 102E and 102F are connected between input terminals 88 and 90 and the + and − inputs of amplifier 104C, respectively. Finally, resistors 102G and 102H are connected between input terminals 92 and 94 and the + and − inputs of amplifier 104D, respectively.

In a preferred embodiment of the present invention, comparator chip 104 is an LM339 integrated circuit. Feedback resistors 106A–106D are connected between the outputs and the + inputs of amplifiers 104A–104D, respectively. Feedback resistors 106A–106D are preferably 100 K ohm resisitors in an eight-pin, SIP resistor package.

Pull-up resistors 108A–108D are connected between the output of amplifiers 104A–104D, respectively and a supply voltage (+5 volts). Pull-up resistors 108A–108D are 3.9 K ohm each.

The A1, A2, B1 and B2 encoder signals are, after processing in input section 96, squarewave signals which are supplied to inputs of flipflop chip 98. In the preferred embodiment of the present invention, flipflop chip 98 is a 74LS396 sixteen-pin integrated circuit which contains flipflops 98A–98H. Flipflop chip 98 receives the a high frequency (2 MHz) clock signal and the A1 and A2 encoder signals, and provides four signals, A1, $A1_D$, A2, and $A2_D$ to the address inputs of ROM 110. Similarly, flipflop chip 98 receives the B1 and B2 encoder signals from input section 96 and provides B1, $B1_D$, B2 and $B2_D$ signals to the address inputs of ROM 110. The four signals supplied by flipflop chip 98 for each feedback axis provide information sufficient to determine the state of the two encoder signals for that feedback axis and whether either encoder signal has just changed state. The A1 signal supplied to ROM 110 represents the "current" state of encoder signal A1, while the $A1_D$ indicates the state of signal A1 at a previous time (in this case one clock pulse earlier). Similarly, the A2 signal supplied to ROM 112 represents the current state of the A2 encoder signal, while the $A2_D$ signal represents the state of the A2 encoder signal at an earlier time. The B1, $B1_D$, B2, and $B2_D$ signals supplied to the inputs of ROM 110 bear a similar relationship for the B axis feedback channel.

In the following discussion of the operation of feedback circuitry 70 (and in particular the operation of ROM 110), only the A feedback channel will be discussed in detail. It should be understood that the B feedback channel (as well as the C, X, Y and Z feedback channels) operates in a similar manner.

The A1 signal from input section 96 is supplied to the D input of flipflop 98A. The Q output of flipflop 98A represents the state of the A1 signal at the input of flipflop 98A when a clock pulse is received at the clock (C) input of flipflop 98A. The output of flipflop 98A is the A1 signal which is supplied to the $A_6$ address input of ROM 110.

The output of flipflop 98A is also supplied to the D input of flipflop 98B. Flipflop 98B receives clock pulses at its C input and produces an output signal at its Q output which represents the state of the signal at its D input at the time when a clock pulse is received. This output signal is designated $A1_D$ and is supplied to the $A_7$ address input of ROM 110. The $A1_D$ signal is, therefore, representative of the state of the A1 signal delayed by one clock pulse. By comparing the states of the A1 and $A1_D$ inputs to ROM 110, it is possible to determine whether a change of staate of the A1 signal has occurred, and if so whether it was a low to high or high to low transition.

The A2 encoder signal from input section 96 is supplied to the D input of flipflop 98C. The Q output of flipflop 98C represents the state of the signal at the D input of flipflop 96C when a clock pulse is received at the C input. This output signal is the A2 signal supplied to address input $A_4$ of ROM 110. The A2 signal output from flipflop 98C is also supplied to the D input of flipflop 98D. Flipflop 98D provides an $A2_D$ signal at its Q output which represents the state of the signal at its D input when a clock pulse is received at its C input. The $A2_D$ signal, therefore, represents the A2 signal delayed by one clock pulse.

Read only memory (ROM) 110 contains stored microcode which determines the state of the $A_{UP}$ and the $A_{DN}$ signals supplied at the Q4 and Q3 outputs, respectively, of ROM 110. ROM 110, therefore, provides the $A_{UP}$ and $A_{DN}$ feedback signals to the clock inputs of timers/counters 60 as a function of the A1, $A1_D$, A2, and $A2_D$ signals at its address inputs and the stored microcode. The $A_{UP}$ and $A_{DN}$ signals are in the form of signal pulses which occur in response to each increment of movement sensed by the encoder 18A along the A axis. Each a $_{UP}$ signal pulse represents an incremental movement in the "positive" direction along the A axis, while each $_{ADN}$ signal pulse represents an incremental movement in the "negative" direction along the A axis.

The signals of the $A_{UP}$ and the $A_{DN}$ feedback signals are maintained by pull-up resistors 112A and 112B, which are connected between the Q4 and Q3 outputs of ROM 110 and a +5 V supply voltage. Similarly, pull-up resistors 112C and 112D are connected between the Q2 and Q1 outputs, respectively, of ROM 110 and the +5 V supply voltage to maintain signal levels of the $B_{UP}$ and $B_{DN}$ feedback signals.

The pulling up of the outputs of ROM 110 by pull-up resistors 112A–112D provides an important feature of the feedback circuitry of the present invention. By lowering the chip select or chip enable ($\overline{CS}$) to ROM 110, the outputs of feedback circuitry 70 go high. By strobing ROM 110 using the $\overline{CS}$ signal, the outputs of feedback circuitry 70 are strobed, which is useful in resetting timers/counters 60.

To illustrate the operation of feedback circuitry 70 of the present invention, the examples shown in FIGS. 3A–3D, 4A–4D, 5A–5D and 6A–6D will be discussed.

FIGS. 3A–3D and 4A–4D illustrate operation of feedback circuitry 70 when the encoder signals are in the form of either squarewave quadrature or sinusoidal format. Input section 96 of feedback circuitry 70 squares the sinusoidal encoder signals so that signals A1 and A2, as they appear at the inputs of flipflops 98A and 98C are squarewave quadrature signals like that shown in FIGS. 3A and 3B and FIGS. 4A and 4B.

FIGS. 3A–3D illustrate positive motion along the A axis, while FIGS. 4A–4D illustrate negative motion along the A axis. In FIGS. 3A–3D, encoder signal A1 leads encoder signal A2 by one-quarter cycle (i.e. 90")In FIGS. 4A–4D, encoder signal A1 lags encoder signal A2 by one-quarter cycle (i.e. 90°).

During each cycle, there are a total of four signal transitions (two by signal A1 and two by signal A2). Feedback circuitry 70 produces a feedback signal pulse for each of the rising and falling edges of signals A1 and A2. Depending upon the direction of motion along the A axis, the feedback signal pulses appear at either the $A_{UP}$ or the $A_{DN}$ output of feedback circuitry 70.

In FIGS. 3A–3D, it can be seen that an $A_{UP}$ feedback pulse is generated when any one of the following events occurs: (i) A1 rises and A2 is low, (ii) A2 rises and A1 is high, (iii) A1 falls and A2 is high, and (iv) A2 falls and A1 is low. This can be written as follows:

$$A_{UP} = A1_R \cdot \overline{A2} + A2_R \cdot A + A1_F \cdot \overline{A2} + A2_F \cdot A1 \qquad \text{Eq. 1}$$

where
- $A1_R$ = rising edge of A1
- $A2_R$ = rising edge of A2
- $A1_F$ = falling edge of A1
- $A2_F$ = falling edge of A2

Similarly, FIGS. 4A-4D show that $A_{DN}$ feedback pulses are produced under any one of the following occurrences: (i) A1 rises while A2 is high, (ii) A2 falls while A1 is high, (iii) A1 falls while A2 is low, and (iv) A2 rises while A1 is low. These conditions for producing $A_{DN}$ signal pulses may be expressed as follows:

$$A_{DN} = A1_R \cdot A2 + A2_F \cdot A1 + A1_F \cdot \overline{A2} + A2_R \cdot \overline{A1} \qquad \text{Eq. 2}$$

It can be seen, therefore, that the $A_{UP}$ and $A_{DN}$ feedback signals can be produced if the states of the A1 and A2 encoder signals are known, and the rising and trailing edges of the A1 and A2 signals are also sensed and known. Feedback circuit 70 of the present invention produces the $A_{UP}$ and $A_{DN}$ signals with a minimum of circuit components. Flipflop circuit 98 produces the A1 and $A1_D$ signals, from which the state of the A1 signal and the occurrence of the rising and trailing edges of the A1 signal can be determined. Similarly, flipflop circuit 98 produces the A2 and $A2_D$ signals from which the current state of the A2 signal, and the occurrence of the rising or trailing edges of the A2 signal can be determined.

In particular, a rising edge of the A1 signal is determined when the A1 signal is high and the $A1_D$ signal is low ($\overline{A1_D}$). Similarly, a rising edge of the A2 signal has occured when the A2 signal is high and the $A2_D$ signal is low ($\overline{A2_D}$). A trailing edge of the A1 signal is present when the A1 signal is low ($\overline{A1}$) and the $A1_D$ signal is high; and a trailing edge of the A2 signal is present when the A2 signal is low ($\overline{A2}$) and the $A2_D$ signal is high. Equations 3, 4, 5 and 6 illustrate these relationships:

$$A1_R = A1 \cdot \overline{A1_D} \qquad \text{Eq. 3}$$

$$A2_R = A2 \cdot \overline{A2_D} \qquad \text{Eq. 4}$$

$$A1_F = \overline{A1} \cdot A1_D \qquad \text{Eq. 5}$$

$$A2_F = \overline{A2} \cdot A2_D \qquad \text{Eq. 6}$$

By substituting Equations 3-6 into Equations 1 and 2, the relationships for producing the $A_{UP}$ and $A_{DN}$ feedback signal pulses can be expressed as follows:

$$A_{UP} = A1 \cdot \overline{A1_D} \cdot \overline{A2} + A2 \cdot \overline{A2_D} \cdot A1 + \overline{A1} \cdot A1_D \cdot A2 + \overline{A2} \cdot A2_D \cdot \overline{A1} \qquad \text{Eq. 7}$$

$$A_{DN} = A1 \cdot \overline{A1_D} = A2 + \overline{A2} \cdot A2_D \cdot A1 + \overline{A1} \cdot A1_D \cdot \overline{A2} + A2 \cdot \overline{A2_D} \cdot \overline{A1} \qquad \text{Eq. 8}$$

The microcode within ROM 110 satisfies Equation 7 to produce the $A_{UP}$ feedback signal at its Q4 output as a function of the signals received at its A4-A7 address inputs. Similarly, microcode stored within ROM 110 satisfies Equation 8 to produce the $A_{DN}$ feedback signal at its Q3 output as a function of the signals received at its A4-A7 address inputs.

An important advantage of feedback circuitry 70 of the present invention is that the logic required to product the $A_{UP}$ and $A_{DN}$ signals is contained within ROM 110 in the form of microcode. This provides great flexibility in design, since the logic can be altered to accommodate different formats of encoder signals simply by changing the microcode. No changes in circuit components are required.

FIGS. 5A-5D and 6A-6D illustrate the operation of feedback circuitry 70 in handling pulsed up/down format encoder signals. This different format can be accommodated using exactly the same circuitry, but simply different microcode stored within ROM 110.

Figure 5A:
FIGS. 5A–5D show, in pulsed up/down format, first and second encoder signals A1 and A2 and first and second feedback signals $A_{UP}$ and $A_{DN}$, respectively, representing motion in a positive direction along axis A of the system of FIGS. 1 and 2.
Figure 5B:
Figure 5C:
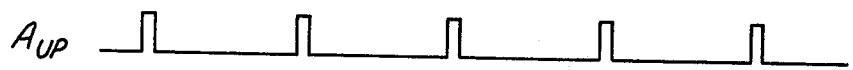
Figure 5D:
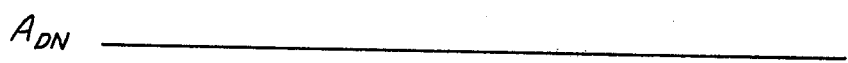
Figure 6A:
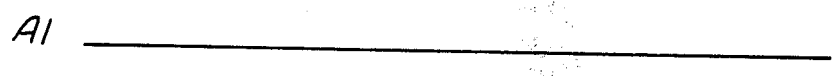
FIGS. 6A–6D show, in pulsed up/down format, first and second encoder signals A1 and A2 and first and second feedback signals $A_{UP}$ and $A_{DN}$, respectively, representing motion in a negative direction along axis A of the system of FIGS. 1 and 2.
Figure 6B:
Figure 6C:
Figure 6D:

FIGS. 5A-5D illustrate movement in a "positive" direction along the A axis, while FIGS. 6A-6D illustrate "negative" movement along the A axis. As shown in FIGS. 5A and 5B, positive motion is indicated by the occurrence of pulses in the A1 encoder signal, while the A2 encoder signal remains low. As shown in FIGS. 6A and 6B, negative motion along the A axis is indicated by pulses in the A2 encoder signal, while the A1 signal remains low.

The microcode required for the pulsed up/down feedback mode satisfies the following relationships:

$$A_{UP} = A1 \cdot \overline{A1_D \cdot A2} \qquad \text{Eq. 9}$$

$$A_{DN} = A2 \cdot \overline{A2_D \cdot A1} \qquad \text{Eq. 10}$$

Depending upon the storage capacity of ROM 110, microcode for both pulse up/down feedback and sinusoidal/squarewave quadrature feedback format can be stored in microcode in ROM 110. The particular microcode used is, in this case, selectable by a select signal supplied to ROM 110. Similarly, other formats of encoder signals can also be processed by the feedback circuitry 70 of the present invention. The microcode within ROM 110 is selected to solve the relationship between the $A_{UP}$ and $A_{DN}$ signals and the four inputs signals A1, $A1_D$, A2, and $A2_D$.

In other embodiments of the present invention, in which the sinusoidal encoder format is not to be encountered, input section 96 of feedback circuitry 70 may not be necessary. In that case, only two integrated circuit chips together with a pull-up resistor package are required for every two axes of feedback. As shown in FIG. 2, flipfloo chip 98 and ROM 110 each handle two separate axes of feedback. Thus to provide six axes of feedback, only three ROM chips and three flipflop chips are required. Depending upon the capacities of the ROM chips and the flipflop chips, the number of pins available, and the density of components on the particular integrated circuit chips, even fewer numbers of individual integrated circuits may be possible.

In the preferred embodiment of the present invention illustrated in FIG. 2, a significant reduction in the total number of components used is achieved, in comparison to prior art feedback circuitry. As a result, the feedback circuitry of the present invention occupies only a small portion of a single printed circuit board while producing up and down feedback pulse signals for a total of six independent axes. This is a significant advantage in cost, size and reliability over prior art circuits.

Although the present invention has been described with reference to preferred embodiments, workers skilled in the art will recognize that changes may be made in form and detail without departing from the spirit and scope of the invention.

What is claimed is:

1. A feedback system for providing a first feedback signal representing incremental motion of a movable means in a first direction along an axis and a second feedback signal representing incremental motion in a second opposite direction along the axis in response to first and second encoder signals from an encoder means, the encoder signals having first and second states depending upon motion of the movable means sensed by the encoder means, the feedback system comprising:

first means for receiving the first encoder signal and producing a first signal having a state dependent upon the state of the first encoder signal and a second signal having a state dependent upon the state of the first encoder signal at a previous time;

second means for receiving the second encoder signal and producing a third signal having a state dependent upon the state of the second encoder signal and a fourth signal having a state dependent upon the state of the second encoder signal at the previous time; and memory means having address inputs for receiving the first, second, third, and fourth signals and having outputs for providing first and second feedback signals, and having stored code defining a predetermined relationship between the first, second, third and fourth signals and the first and second feedback signals, the memory means producing the first and second feedback signals as a function of the first, second, third and fourth signals and the stored code.

2. The feedback system of claim 1 wherein the first signal has a first state $A1$ and a second state state $\overline{A1}$; the second signal has a first state $A1_D$ and a second state $\overline{A1_D}$; the third signal has a first state $A2$ and a second state $\overline{A2}$; and the fourth signal has a first state $A2_D$ and a second state $\overline{A2_D}$.

3. The feedback system of claim 2 wherein the first and second encoder signals have a phase relationship which indicates the direction of incremental motion along the axis.

4. The feedback system of claim 3 wherein the memory means contains stored code for producing the first feedback if $A1 \cdot \overline{A1_D} \cdot A2 + A2 \cdot \overline{A2_D} \cdot A1 + \overline{A1} \cdot A1_D \cdot A2 + \overline{A2} \cdot A2_D \cdot \overline{A1}$, and contains stored code for producing the second feedback signal if $A1 \cdot \overline{A1_D} \cdot \overline{A2} + \overline{A2} \cdot A2_D \cdot A1 + \overline{A1} \cdot A1_D \cdot \overline{A2} + A2 \cdot \overline{A2_D} \cdot \overline{A1}$.

5. The feedback system of claim 2 wherein the first encoder signal contains pulse transitions between the second and first states and the second encoder signal remains in the second state to indicate incremental motion in the first direction, and wherein the second encoder signal contains pulse transitions between the second and first states and the first encoder signal remains in the second state to indicate incremental motion in the second direction.

6. The feedback system of claim 5 wherein the memory means contains stored code for producing the first feedback signal if $A1 \cdot \overline{A1_D} \cdot \overline{A2}$ and contains stored code for producing the second feedback signal if $A2 \cdot \overline{A2_D} \cdot \overline{A1}$.

7. The feedback system of claim 1 wherein the first means comprises:

clock means for providing a clock signal;

first flipflop means having an input for receiving the first encoder signal, a clock input for receiving the clock signal, and an output for providing the first signal which is a function of the state of the first encoder signal when the clock signal is received; and second flipflop means having an input for receiving the first signal, a clock input for receiving the clock signal, and an output for providing the second signal which is a function of the state of the first signal when the clock signal is received.

8. The feedback system of claim 7 wherein the second means comprises:

third flipflop means having an input for receiving the second encoder signal, a clock input for receiving the clock signal, and an output for providing the third signal which is a function of the state of the second encoder signal when the clock signal is received; and fourth flipflop means having an input for receiving the third signal, a clock input for receiving the clock signal, and an output for providing the fourth signal which is a function of the state of the third signal when the clock signal is received.

9. The feedback system of claim 1 wherein the first and second encoder signals are sinusoidal signals having a phase relationship which indicates the direction of incremental motion along the axis, and wherein the system further comprises:

input circuit means for converting the first and second encoder signals to first and second squarewave quadrature encoder signals and supplying the first and second squarewave quadrature encoder signals to the first and second means, respectively.

10. The feedback system of claim 1 and further comprising:

pull-up resistor means connected between the outputs of the memory means and a supply voltage.

11. The feedback system of claim 10 wherein the memory means has a control input for receiving a select signal to activate the outputs of the memory means.

12. A feedback system for providing a first feedback signal representing incremental motion of a movable means in a first direction along an axis and a second feedback signal representing incremental motion in a second opposite direction along the axis, in response to first and second encoder signals from an encoder means, the encoder signals having first and second states depending upon motion of the movable means sensed by the encoder means, the feedback system comprising:

first means for receiving the first encoder signal and producing signals which indicate the state of the first encoder signal and whether the first encoder signal has changed state within a predetermined time interval;

second means for receiving the second encoder signal and producing signals which indicate the state of the second encoder signal and whether the second encoder signal has changed state within a predetermined time interval; and memory means having inputs for receiving the signals from the first and second means, having outputs for providing the first and second feedback signals, and having stored code defining a predetermined relationship between the signals from the first and second means and the first and second feedback signals, the memory means producing the first and second feedback signals as a function of the signals from the first and second means and the stored code.

13. The feedback system of claim 12 wherein the signals produced by the first means include a first signal having a first state $A1$ and a second state $\overline{A1}$ and a second signal representative of the first signal at a previous time and having a first state $\overline{A1_D}$ and a second state $A1_D$; and wherein the signals produced by the second means include a third signal having a first state A2 and a second state $\overline{A2}$ and a fourth signal representative of the third signal at a previous time and having a first state $A2_D$ and a second state $\overline{A2_D}$.

14. The feedback system of claim 13 wherein the first and second encoder signals have a phase relationship which indicates the direction of incremental motion along the axis.

15. The feedback system of claim 14 wherein the memory means contains stored code for producing the first feedback signal if $A1 \cdot \overline{A1_D} \cdot \overline{A2} + A2 \cdot \overline{A2_D} \cdot A1 + \overline{A1} \cdot A1_D \cdot A2 + \overline{A2} \cdot A2_D \cdot \overline{A1}$, and contains stored code for producing the second feedback signal if $A1 \cdot \overline{A1_D} \cdot A2 + \overline{A2} \cdot A2_D \cdot A1 + \overline{A1} \cdot A1_D \cdot \overline{A2} + A2 \cdot \overline{A2_D} \cdot \overline{A1}$.

16. The feedback system of claim 14 wherein the first encoder signal contains pulse transitions between the second and first states and the second encoder signal remains in the second state to indicate incremental motion in the first direction, and wherein the second encoder signal contains pulse transitions between the second and first states and the first encoder signal remains in the second state to indicate incremental motion in the second direction.

17. The feedback system of claim 16 wherein the memory means contains stored code for producing the first feedback signal if $A1 \cdot \overline{A1_D} \cdot \overline{A2}$ an contains stored code for producing the second feedback signal if $A2 \cdot \overline{A2_D} \cdot \overline{A1}$.

18. The feedback system of claim 12 wherein the first means comprises:
 clock means for providing a clock signal;
 first flipflop means having an input for receiving the first encoder signal, a clock input for receiving the clock signal, and an output for providing a first signal which is a function of the state of the first encoder signal when the clock signal is received; and
 second flipflop means having an input for receiving the first signal, a clock input for receiving the clock signal, and an output for providing a second signal which is a function of the state of the first signal when the clock signal is received.

19. The feedback system of claim 18 wherein the second means comprises:
 third flipflop means having an input for receiving the second encoder signal, a clock input for receiving the clock signal, and an output for providing a third signal which is a function of the state of the second encoder signal when the clock signal is received; and
 fourth flipflop means having an input for receiving the third signal, a clock input for receiving the clock signal, and an output for providing a fourth signal which is a function of the state of the third signal when the clock signal is received.

20. The feedback system of claim 12 wherein the first and second encoder signals are sinusoidal signals having a phase relationship which indicates the direction of incremental motion along the axis, and wherein the system further comprises:
 input circuit means for converting the first and second encoder signals to first and second squarewave quadrature encoder signals and supplying the first and second squarewave quadrature encoder signals to the first and second means, respectively.

21. The feedback system of claim 12 and further comprising:
 pull-up resistor means connected between the outputs of the memory means and a supply voltage.

22. The feedback system of claim 21 wherein the memory means has a control input for receiving a select signal to activate the outputs of the memory means.

23. A feedback system for providing first and second feedback signals as a function of first and second encoder signals, the feedback system comprising:
 clock means for providing a clock signal;
 first flipflop means having an input for receiving the first encoder signal, a clock input for receiving the clock signal, and an output for providing a first signal having a state which is a function of a state of the first encoder signal when the clock signal is received;
 second flipflop means having an input for receiving the first signal, a clock input for receiving the clock signal, and an output for providing a second signal having a state which is a function of the state of the first signal when the clock signal is received;
 third flipflop means having an input for receiving the second encoder signal, a clock input for receiving the clock signal, and an output for providing a third signal having a state which is a function of a state of the second encoder signal when the clock signal is received;
 fourth flipflop means having an input for receiving the third signal, a clock input for receiving the clock signal, and an output for providing a fourth signal having a state which is a function of the state of the third signal when the clock signal is received; and
 memory means having inputs for receiving the first, second, third, and fourth signal, having outputs for providing the first and second feedback signals, and having stored code defining a predetermined relationship between the first, second, third and fourth signals and the first and second feedback signals, the memory means producing the first and second feedback signals as a function of the first, second, third, and fourth signals and the stored code.

24. The feedback system of claim 23 wherein the first signal has a first state A1 and a second state state $\overline{A1}$; the second signal has a first state $A1_D$ and a second state $\overline{A1_D}$; the third signal has a first state A2 and a second state $\overline{A2}$; and the fourth signal has a first state $A2_D$ and a second state $\overline{A2_D}$.

25. The feedback system of claim 24 wherein the first and second encoder signals have a phase relationship which indicates a direction of incremental motion along an axis.

26. The feedback system of claim 25 wherein the memory means contains stored code for producing the first feedback signal if $A1 \cdot \overline{A1_D} \cdot \overline{A2} + A2 \cdot \overline{A2_D} \cdot A1 + \overline{A1} \cdot A1_D \cdot A2 + \overline{A2} \cdot A2_D \cdot \overline{A1}$, and contains stored code for producing the second feedback signal if $A1 \cdot \overline{A1_D} \cdot A2 + \overline{A2} \cdot A2_D \cdot A1 + \overline{A1} \cdot A1_D \cdot \overline{A2} + A2 \cdot \overline{A2_D} \cdot \overline{A1}$.

27. The feedback system of claim 24 wherein the first encoder signal contains pulse transitions between a pair of states and the second encoder signal remains in the one state to indicate incremental motion in a first direction, and wherein the second encoder signal contains pulse transitions between a pair of states and the first encoder signal remains in one state to indicate incremental motion in a second direction.

28. The feedback system of claim 27 wherein the memory means contains stored code for producing the first feedback signal if $A1 \cdot \overline{A1_D} \cdot \overline{A2}$ and contains stored code for producing the second feedback signal if $A2 \cdot \overline{A2_D} \cdot \overline{A1}$.

29. The feedback system of claim 23 wherein the first and second encoder signals are sinusoidal signals having a phase relationship which indicates a direction of incremental motion along an axis, and wherein the system further comprises:

input circuit means for converting the first and second encoder signals to first and second squarewave quadrature encoder signals and supplying the first and second squarewave quadrature encoder signals to the first and third flipflop means, respectively.

30. The feedback system of claim 23 and further comprising:

pull-up resistor means connected between the outputs of the memory means and a supply voltage.

31. The feedback system of claim 23 wherein the memory means has a control input for receiving a select signal to activate the outputs of the memory means.

* * * * *